(12) United States Patent
Lee

(10) Patent No.: US 6,921,173 B2
(45) Date of Patent: Jul. 26, 2005

(54) TILT-FOOT MECHANISM FOR PROJECTOR (75) Inventor: Junsi Lee, Tokyo (JP)

(73) Assignee: NEC Viewtechnology, Ltd., Tokyo (JP)

(*) Notice: Subject to any disclaimer, the term of this patent is extended or adjusted under 35 U.S.C. 154(b) by 0 days.

(21) Appl. No.: 10/845,140

(22) Filed: May 14, 2004

(65) Prior Publication Data
US 2004/0239891 A1 Dec. 2, 2004

(30) Foreign Application Priority Data
May 27, 2003 (JP) ........................................ 2003-149480

(51) Int. Cl.⁷ .............................................. G03B 21/14
(52) U.S. Cl. ........................... 353/69; 353/119; 353/70; 248/188.2
(58) Field of Search .......................... 353/69, 70, 119; 248/157, 161, 188.2, 188.8, 398

(56) References Cited
U.S. PATENT DOCUMENTS
6,302,543 B1 * 10/2001 Arai et al. ..................... 353/70
6,461,002 B1 * 10/2002 Su ............................... 353/119
6,715,890 B2 * 4/2004 Huang et al. ................ 353/119
6,793,348 B2 * 9/2004 Lee et al. .................... 353/119
6,796,538 B2 * 9/2004 Hsu et al. ................. 248/188.2
2002/0140909 A1 * 10/2002 Tanaka ......................... 353/70

FOREIGN PATENT DOCUMENTS
JP          9-287695        11/1997
JP          10-267013       10/1998
JP          2002-139796     5/2002

* cited by examiner

Primary Examiner—William Dowling
(74) Attorney, Agent, or Firm—Young & Thompson (57) ABSTRACT A tilt foot mechanism includes: two or more tilt feet that allow adjustment of the length of extension with respect to the bottom surface of the case of a projector; two or more locking levers that are each provided corresponding to each of the tilt feet; an elastic part that presses each of the locking levers against a corresponding tilt foot to thus lock the tilt foot; and a control button for causing the two or more locking levers to simultaneously separate from the tilt feet against the pressure of the elastic part.

10 Claims, 7 Drawing Sheets

TILT-FOOT MECHANISM FOR PROJECTOR

BACKGROUND OF THE INVENTION

1. Field of the Invention

The present invention relates to a tilt foot mechanism for a projector.

2. Description of the Related Art

A projector is an image display device of the projection-type for displaying image by projecting image lights on a projection surface such as a screen. Accordingly, obtaining the desired image necessitates adjustment of not only the distance between the projector and the projection surface and the relative positions of the projector and projection surface, but also the angle of the projector. Feet (tilt-feet) having adjustable lengths are thus provided on the bottom surface of the projector case whereby the angle of the projector can be adjusted by modifying the lengths of the tilt feet. This angle adjustment includes both the adjustment of the angle of inclination in the vertical direction and the adjustment of the angle of inclination in the horizontal direction.

The arrangement of the above-described tilt feet can take three forms. In the first type of projector, a single tilt foot is provided at the front of the bottom of the case, and two tilt feet are provided at the rear. In this type of projector, the angle of inclination in the vertical direction is adjusted chiefly by means of the front tilt foot, and the angle of inclination in the horizontal direction is adjusted chiefly by means of the two rear tilt feet. In the second type of projector, two tilt feet are provided at the front of the case bottom, and a fixed foot (rear foot) having a fixed, nonadjustable length is provided at the rear. In this type of projector, the angle of inclination in both the vertical and horizontal directions is adjusted by means of the two tilt feet. In the third type of projector, two tilt feet are provided at the front of the bottom of the case, and two tilt feet are also provided at the rear. In this type of projector, the angle of inclination in the vertical and horizontal directions can be adjusted by means of any of the tilt feet.

Figure 1A:
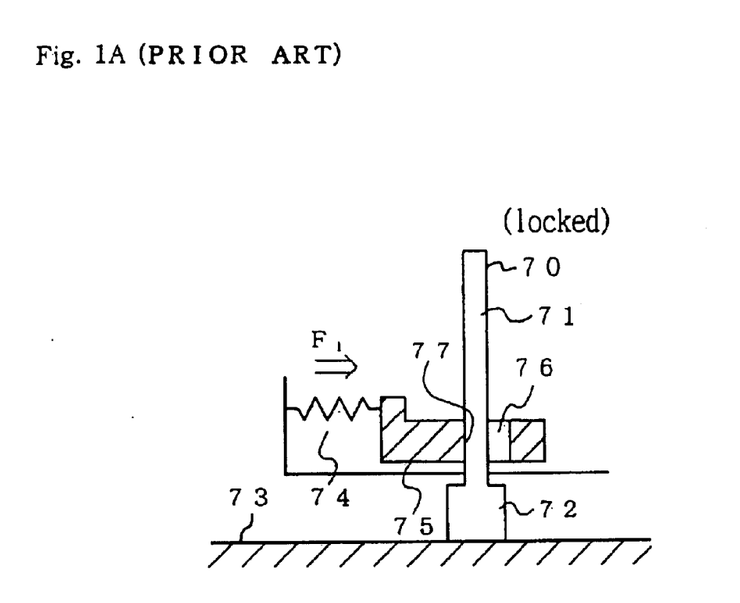
FIG. 1A shows one example of a tilt foot of the prior art with the tilt foot in the locked state.
Figure 1B:
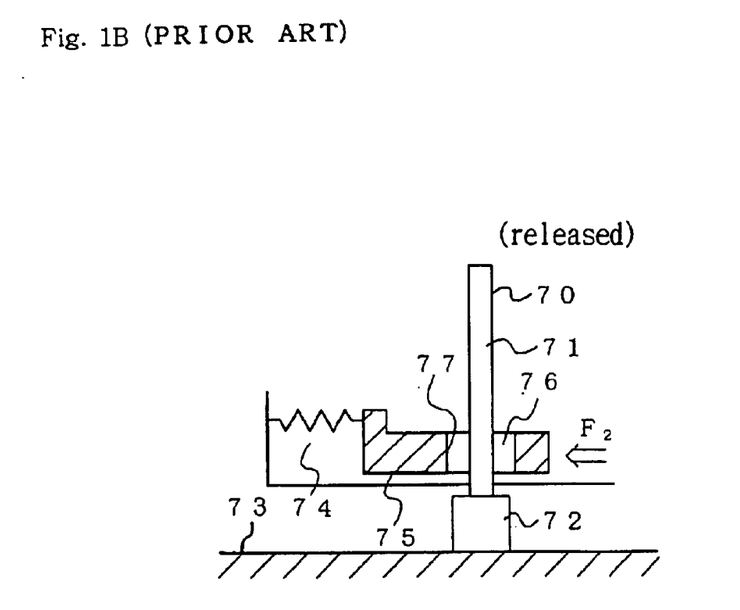
FIG. 1B shows the released state of the tilt foot shown in FIG. 1A.

FIGS. 1A and 1B show one example of a tilt foot of the prior art. FIG. 1A shows tilt foot 70 in the locked state, and FIG. 1B shows tilt foot 70 in the released state. Tilt foot 70 includes shaft 71 that projects from the bottom surface of the case and foot 72 that contacts the installation surface such as the top surface of a table. Shaft 71 passes through opening 76 of locking lever 75 that can slide back and forth. One end of compressed spring 74 is secured to any point of the case and the other end is secured to locking lever 75.

Accordingly, the restoring force $F_1$ of spring 74 presses the inner surface (locking surface 77) of opening 76 of locking lever 75 against shaft 71, thereby locking shaft 71 (refer to FIG. 1A). However, when a control button (not shown) is pressed, a force $F_2$ in the opposite direction of the restoring force $F_1$ acts upon locking lever 75 by way of a release mechanism that is not shown in the figure, whereby locking lever 75 slides and locking surface 77 separates from shaft 71 (refer to FIG. 1B). As a result, the locked state of shaft 71 is released, and the length of the extension of shaft 71 can be adjusted. After the length of the extension of shaft 71 has been adjusted to the desired length, the control button is released, and locking lever 75 automatically returns to its original position, whereby shaft 71 is again locked.

Figure 2A:
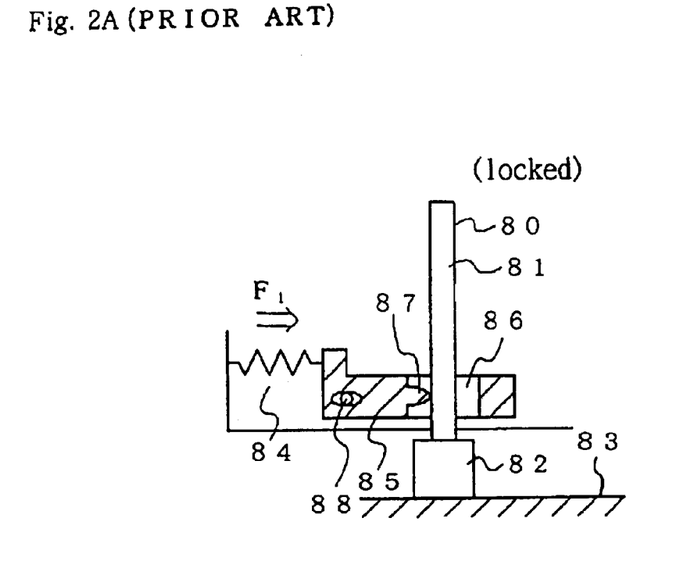
FIG. 2A shows another example of a tilt foot of the prior art with the tilt foot in the locked state.
Figure 2B:
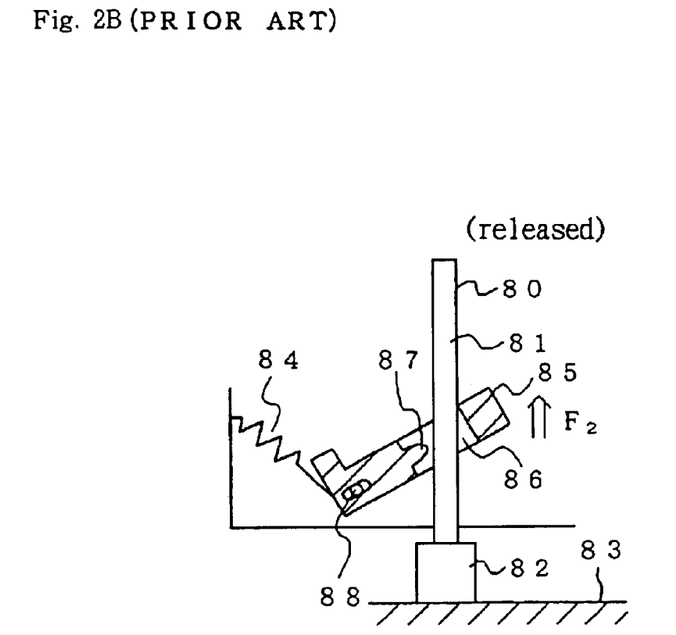
FIG. 2B shows the released state of the tilt foot shown in FIG. 2A.

FIGS. 2A and 2B show another example of a tilt foot of the prior art. FIG. 2A shows tilt foot 80 in the locked state, and FIG. 2B shows tilt foot 80 in the released state. Tilt foot 80 includes shaft 81 that protrudes from the bottom surface of the case and foot 82 that contacts installation surface 83 such as the top surface of a table. Shaft 81 passes through opening 86 of locking lever 85 that can slide back and forth, and projection 87 is formed on the inner surface of opening 86. Locking lever 85 is rotatably supported by means of axis of rotation 88, and one end of locking lever 85 is secured to one end of spring 84. The other end of spring 84 is secured to any position of the case.

Accordingly, the restoring force $F_1$ of spring 84 normally presses projection 87 of locking lever 85 against shaft 81, thereby locking shaft 81 (refer to FIG. 2A). However, when a control button (not shown in the figure) is pressed, force $F_2$ acts upon locking lever 85 by way of a release mechanism (not shown in the figure) such that locking lever 85 rotates around axis of rotation 88 as the fulcrum and projection 87 separates from shaft 81 (refer to FIG. 2B). As a result, the locked state of shaft 81 is released, and the length of the extension of shaft 81 can be adjusted. After the length of the extension of shaft 81 has been adjusted to the desired length, the control button is released and locking lever 85 automatically returns to its original position, whereby shaft 81 is again locked.

As described in the foregoing explanation, one control button was provided for one tilt foot in the prior art. In other words, only one foot could be locked or released through the manipulation of one control button. Accordingly, adjusting the lengths of protrusion of two or more tilt feet necessitated the separate manipulation of two or more control buttons, and operability was extremely poor.

SUMMARY OF THE INVENTION

It is an object of the present invention: to provide a tilt foot mechanism that can solve the above-described problem of the prior art; and to provide a projector that is provided with such a tilt foot mechanism.

The projector tilt foot mechanism of the present invention includes a release mechanism that, through the manipulation of a single control button, causes two or more locking levers that are usually pressing against two or more tilt feet to simultaneously separate from the corresponding tilt feet.

In one release mechanism, rotating levers are linked to each of the locking levers. When the control button is pressed, the two or more rotating levers simultaneously rotate, whereby the two or more locking levers that are linked to the rotating levers simultaneously move and separate from the tilt feet. As an example, depressions are formed in each of the locking levers and control button, one end of each of the rotating levers being caught by the depression in a corresponding locking lever, and the other end of each of the rotating levers being caught by the depression in the control button. Alternatively, one end of each of the rotating levers is rotatably linked to a corresponding locking lever by a linking pin, and the other end is rotatably linked to the control button by a linking pin.

The restoring force of an elastic part causes each of the locking levers to press against a corresponding tilt foot. The elastic part may directly press a locking lever against the tilt foot, or may indirectly press a locking lever against a tilt foot by way of the control button and a rotating lever. A locking lever can be provided with a locking surface that is pressed against the outer circumference of a tilt foot. Irregularities can be formed on the locking surface, these irregularities meshing with irregularities that are formed on the outer circumference of the tilt foot. The locking surface can also be formed from an elastic material. Forming irregularities on the locking surface or forming the locking surface from an elastic material allows more secure locking of the tilt foot.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 3A:
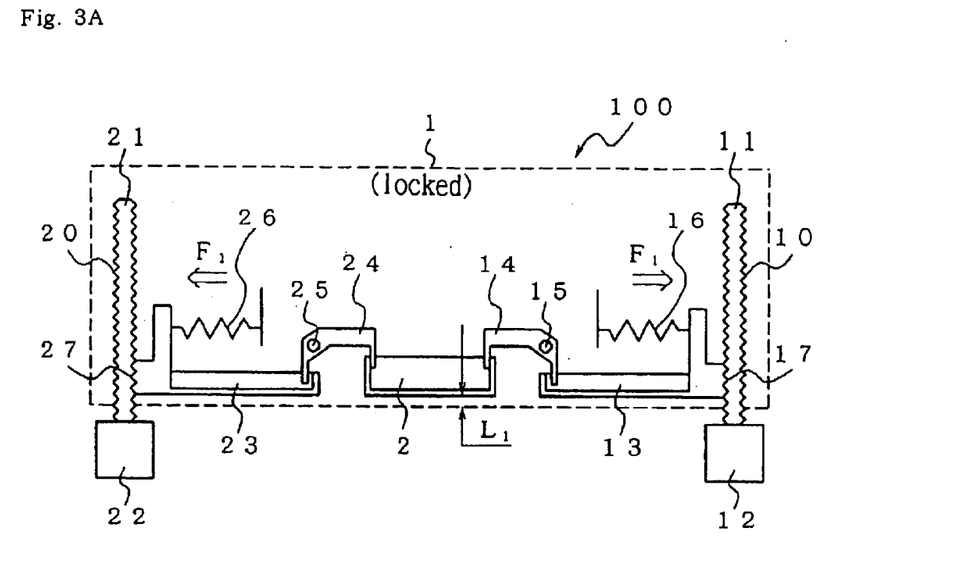
FIG. 3A shows the first embodiment of the projector of the present invention with the tilt foot in the locked state.
Figure 3B:
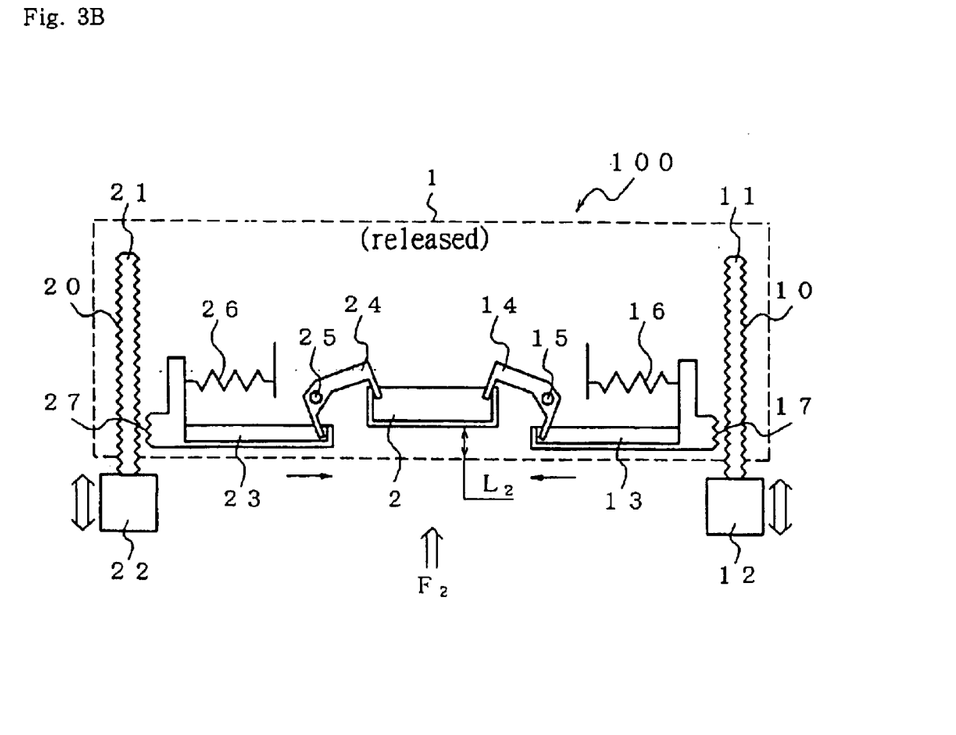
FIG. 3B shows the released state of the tilt foot shown in FIG. 3A.
Figure 4A:
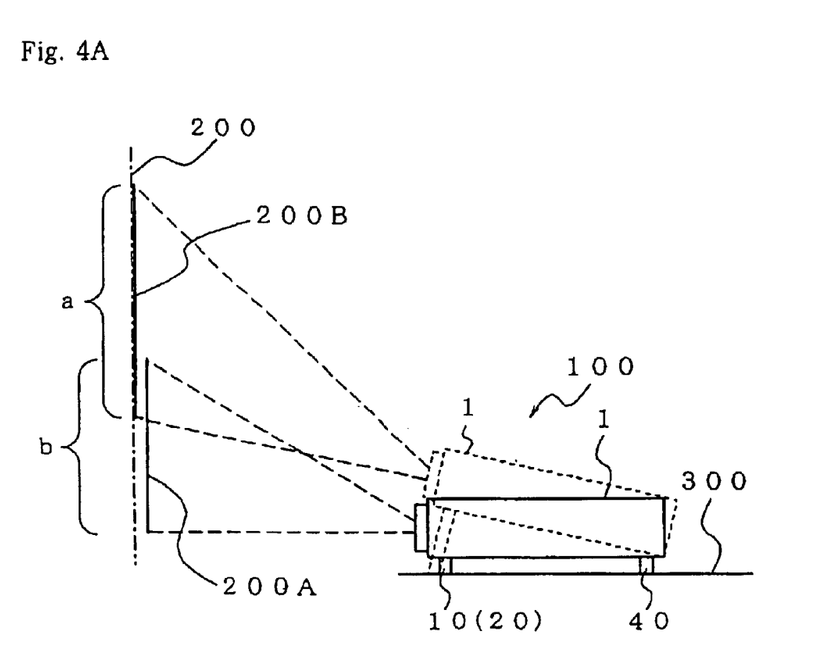
FIG. 4A shows the use of the tilt feet to adjust the vertical angle of the projector.

As shown in FIGS. 3A and 3B, projector 100 of the present embodiment includes first tilt foot 10, second tilt foot 20, and rear foot 40 (refer to FIG. 4A). The two tilt feet 10 and 20 are provided on both sides at the front of the bottom surface of case 1 of projector 100, and rear foot 40 is provided in the center of the rear of the bottom surface. FIG. 3A shows the locked state of first tilt foot 10 and second tilt foot 20, and FIG. 3B shows the released state of first tilt foot 10 and second tilt foot 20.

First tilt foot 10 includes shaft 11 that passes in and out of a hole that is provided in the bottom surface of case 1, and foot 12 that contacts an installation surface such as the top surface of a table. Similarly, second tilt foot 20 includes shaft 21 that passes in and out of another hole that is provided in the bottom surface of case 1, and foot 22 that contacts an installation surface such as the top surface of a table.

Control button 2 is provided between the two shafts 11 and 21; and first rotating lever 14, first locking lever 13, and first spring 16 are provided between control button 2 and shaft 11. First rotating lever 14 is rotatably supported by first axis of rotation 15, and is further provided with a protrusion on each end. One of the protrusions of first rotating lever 14 is caught by the depression of control button 2, and the other protrusion is caught by the depression of first locking lever 13. First locking lever 13 is able to slide back and forth in a direction that is orthogonal to the direction of movement of shaft 11 and is ordinarily pressed against the side of shaft 11 under the restoring force $F_1$ of first spring 16, which is set in a compressed state. Accordingly, when control button 2 is not being manipulated, locking surface 17 of first locking lever 13 is pressed against the outer surface of shaft 11 by first spring 16, whereby shaft 11 is locked. A multiplicity of irregularities, (for example thread ridges and thread grooves) is formed on locking surface 17 and on the outer surface of shaft 11, and intermeshing of the irregularities that are formed on locking surface 17 with the irregularities that are formed on the outer surface of shaft 11 securely locks shaft 11.

Second rotating lever 24, second locking lever 23, and second spring 26 are provided between control button 2 and shaft 21. Second rotating lever 24 is rotatably supported by second axis of rotation 25 and is provided with a protrusion on each end. One of the protrusions of second rotating lever 24 is caught by the depression of control button 2, and the other protrusion is caught by the depression in second locking lever 23. Second locking lever 23 is capable of sliding back and forth in a direction that is orthogonal to the direction of movement of shaft 21, and is ordinarily pressed against the side of shaft 21 by the restoring force $F_1$ of second spring 26, which is set in a compressed state. Accordingly, when control button 2 is not being manipulated, second spring 26 presses second locking lever 23 against the side of shaft 21, whereby locking surface 27 is pressed against the outer surface of shaft 21 and shaft 21 is locked. A multiplicity of irregularities (for example, thread ridges and thread grooves) is formed in locking surface 27 and in the outer surface of shaft 21, and intermeshing between the irregularities that are formed in locking surface 27 and the irregularities that are formed in the outer surface of shaft 21 securely lock shaft 21.

If male screw threads or female screw threads are formed on the outer surface of shafts 11 and 21, female screw threads or male screw threads that mesh with the male screw threads or female screw threads formed on the outer surface of shafts 11 and 21 can be formed on the inside surfaces of the holes in the bottom surface of the case through which these shafts 11 and 21 pass, and these screw pitches can then be used to fine-adjust the lengths of extension of shafts 11 and 21.

Instead of forming irregularities on locking surfaces 17 and 27 of looking levers 13 and 23, locking surfaces 17 and 27 can be formed from an elastic material having great frictional resistance such as rubber, whereby shafts 11 and 21 can be securely locked.

In projector 100 of the present embodiment having the above-described construction, when control button 2 is pressed by force $F_2$ toward the interior of case 1 an inward distance of $L_2$, locking levers 13 and 23 slide against the restoring force $F_1$ of springs 16 and 26 due to the leverage of rotating levers 14 and 24, and locking surfaces 17 and 27 separate from shafts 11 and 21. More specifically, when control button 2 is pressed in, one end of each of two rotating levers 14 and 24 that is caught by the depression of control button 2 is lifted up and rotating levers 14 and 24 each rotate with axes of rotation 15 and 25 as fulcrums, as shown in FIG. 3B. When rotating levers 14 and 24 rotate, the other ends of each of rotating levers 14 and 24 that are caught in the depressions of the two locking levers 13 and 23 move in the direction of mutual approach, and the two locking levers 13 and 23 are thus caused to slide inwardly. As a result, locking surfaces 17 and 27 of locking levers 13 and 23 are separated from the outer surfaces of shafts 11 and 21, and the locked state is released.

Figure 4B:
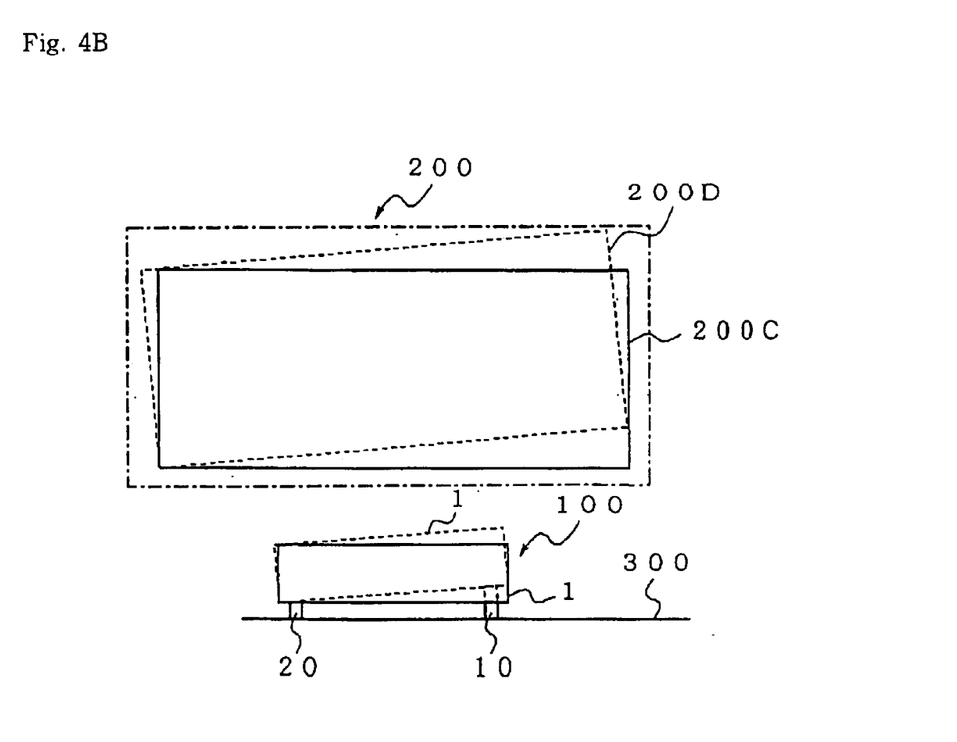
FIG. 4B shows the use of the tilt feet to adjust the horizontal tilt angle of the projector.

With the release of the locked state of the two shafts 11 and 21, the lengths of first tilt foot 10 and second tilt foot 20 can be adjusted and the angle of projector 100 also adjusted. For example, if first tilt foot 10 and second tilt foot 20 are made shorter as shown in FIG. 4A, image 200B that was projected onto area "a" of screen 200 can be shifted downward and projected onto area "b." Conversely, if first tilt foot 10 and second tilt foot 20 are made longer, image 200A that was projected onto area "b" of screen 200 can be shifted upward and projected onto area "a." Alternatively, if first tilt foot 10 is made longer than second tilt foot 20 as shown in FIG. 4B, image 200C that was projected onto screen 200 can be tilted as shown by image 200D. As is obvious from the above-described construction, when first tilt foot 10 and second tilt foot 20 have reached the desired lengths, simply releasing pressure upon control button 2 causes simultaneous locking of first tilt foot 10 and second tilt foot 20.

The present invention as described hereinabove allows the locked state of two or more tilt feet to be simultaneously released through the manipulation of a single control button. In addition, two or more tilt feet that are in the released state can be simultaneously locked through the manipulation of a single control button.

Figure 5:
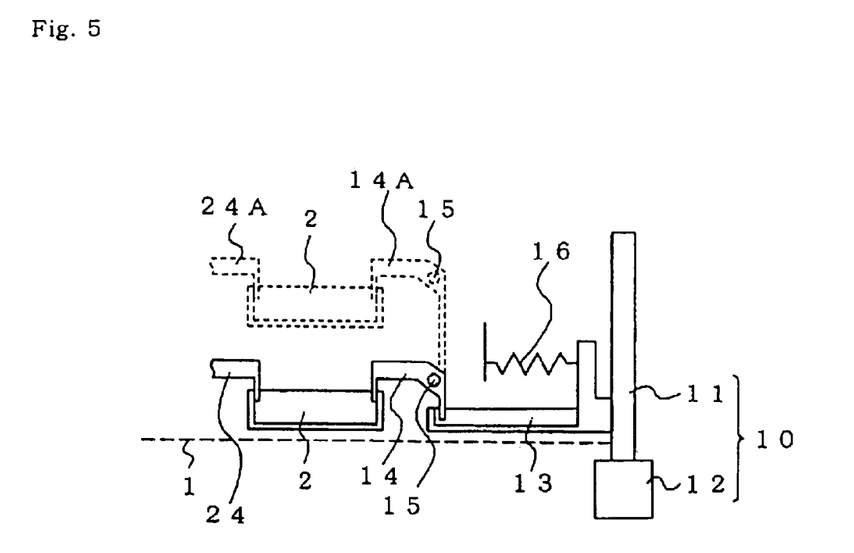
FIG. 5 shows a modification of the projector that is shown in FIGS. 3A and 3B.

FIG. 5 shows a modification of projector 100 that is shown in FIGS. 3A and 3B. In the projector that is shown in FIG. 5, rotating levers 14 and 24 that are shown in FIGS. 3A and 3B are modified to rotating levers 14A and 24A in which one end is extended in the vertical direction, whereby control button 2 can be arranged in a more interior position of case 1. As can be clearly understood from FIG. 5, the position of control button 2 can be freely altered in the vertical direction by simply modifying the length of one end of each of first rotating lever 14A and second rotating lever 24A.

In addition, control button 2 and rotating lever 14 that are depicted by solid lines in FIG. 5 are imaginary components that are depicted to indicate positions of control button 2 and rotating lever 14 that are shown in FIGS. 3A and 3B.

Figure 6:
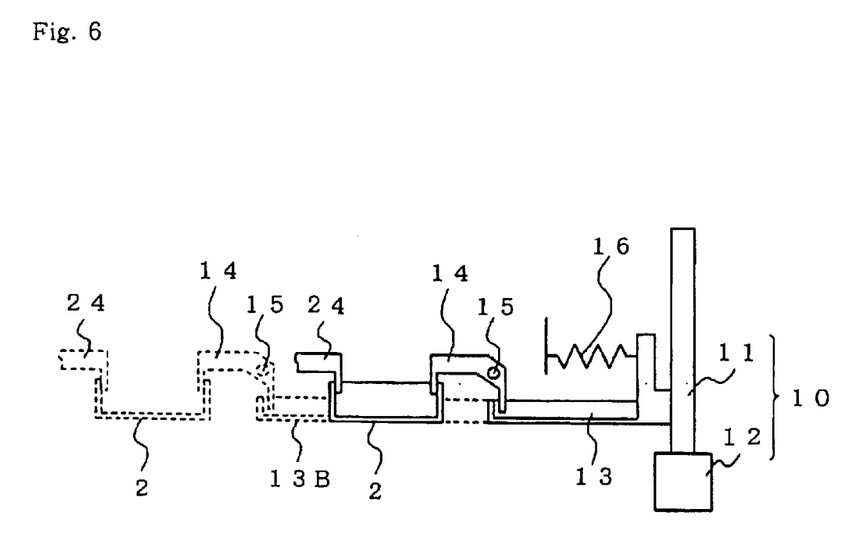
FIG. 6 shows a modification of the projector that is shown in FIGS. 3A and 3B that differs from the modification shown in FIG. 5.

FIG. 6 shows another modification of projector 100 that is shown in FIGS. 3A and 3B. In the projector that is shown in FIG. 6, control button 2 is offset toward tilt foot 20 that is shown in FIG. 3A and FIG. 3B by modifying locking lever 13 that is shown in FIGS. 3A and 3B to a longer locking lever 13B and by modifying locking lever 23 to a shorter locking lever (not shown in FIG. 6). Obviously, control button 2 can be offset toward tilt foot 10 if locking lever 23 that is shown in FIGS. 3A and 3B is converted to a longer locking lever and locking lever 13 is converted to a shorter locking lever. Further, it will be clear that the control button can be arranged at any position between the two tilt feet by freely setting the length of the two locking lever.

In addition, control button 2 and locking lever 13 that are depicted by solid lines in FIG. 6 are imaginary components that are depicted to indicate positions of control button 2 and locking lever 13 that are shown in FIGS. 3A and 3B.

Figure 7A:
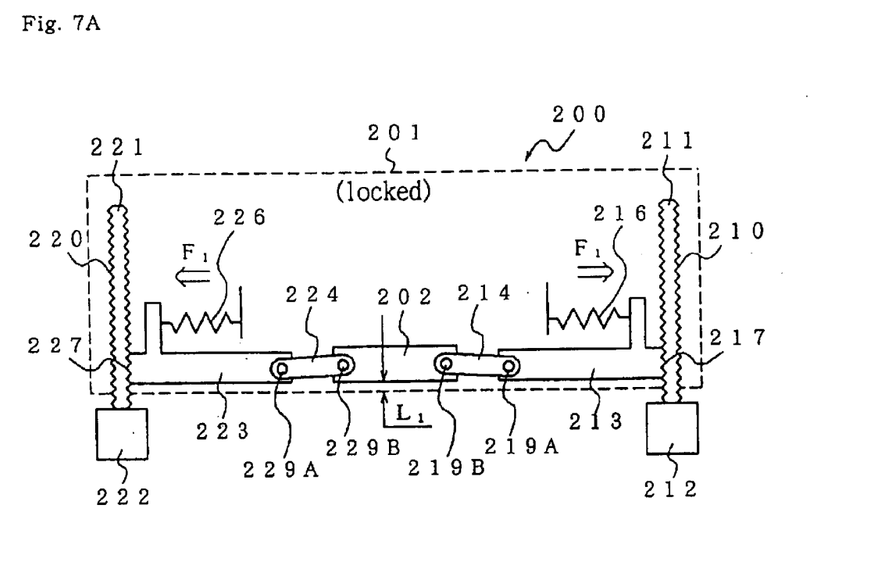
FIG. 7A shows the second embodiment of the projector of the present invention with the tilt foot in the locked state.
Figure 7B:
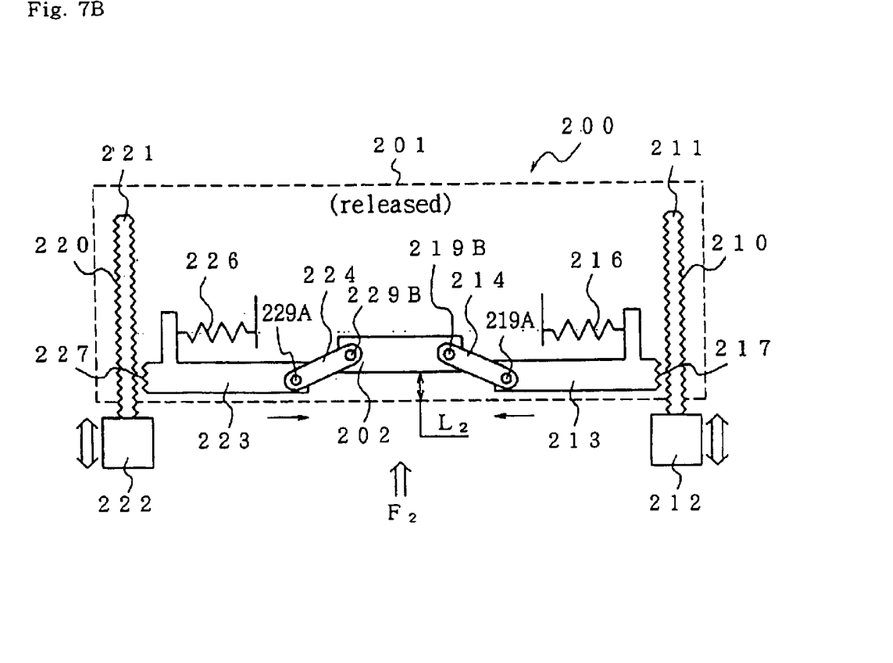
FIG. 7B shows the released state of the tilt foot shown in FIG. 7A.

FIGS. 7A and 7B show another embodiment of the projector of the present invention. FIG. 7A shows a case in which first tilt foot 210 and second tilt foot 220 are locked, and FIG. 7B shows a case in which the locked state of first tilt foot 210 and second tilt foot 220 is released.

Projector 200 that is shown in FIGS. 7A and 7B is advantageous in that the shape of the rotating levers is simple. First rotating lever 214 and second rotating lever 224 that are shown in FIGS. 7A and 7B are actually nothing more than thin rectangular plates.

One end of first rotating lever 214 is rotatably linked to first locking lever 213 by first linking pin 219A, and the other end is rotatably linked to control button 202 by second linking pin 219B. One end of second rotating lever 224 is rotatably linked to second locking lever 223 by third linking pin 229A, and the other end is rotatably linked to control button 202 by fourth linking pin 229B. In other words, first rotating lever 214 is rotatably linked to first locking lever 213 and control button 202, and second rotating lever 224 is rotatably linked to second locking lever 223 and control button 202. Accordingly, as shown in FIG. 7B, when control button 202 is pushed upward, first locking lever 213 and second locking lever 223 move similarly to first locking lever 13 and second locking lever 23 that are shown in FIG. 3B, and the locked state of the two tilt feet 210 and 220 is released simultaneously.

First rotating lever 214 and second rotating lever 224 that are shown in FIGS. 7A and 7B can also be constituted by flexible wires. Forming first rotating lever 214 and second rotating lever 224 by wires enables a reduction of the weight of projector 200. When first rotating lever 214 is formed from wire, one end of the wire is wound around first linking pin 219A and the other end is wound around second linking pin 219B. Further, when second rotating lever 224 is formed from wire, one end of the wire is wound around third linking pin 229A and the other end is wound around fourth linking pin 229B. Alternatively, one end of the wire can be secured directly to locking lever and control button, whereby the first to fourth linking pins can be omitted.

Figure 8A:
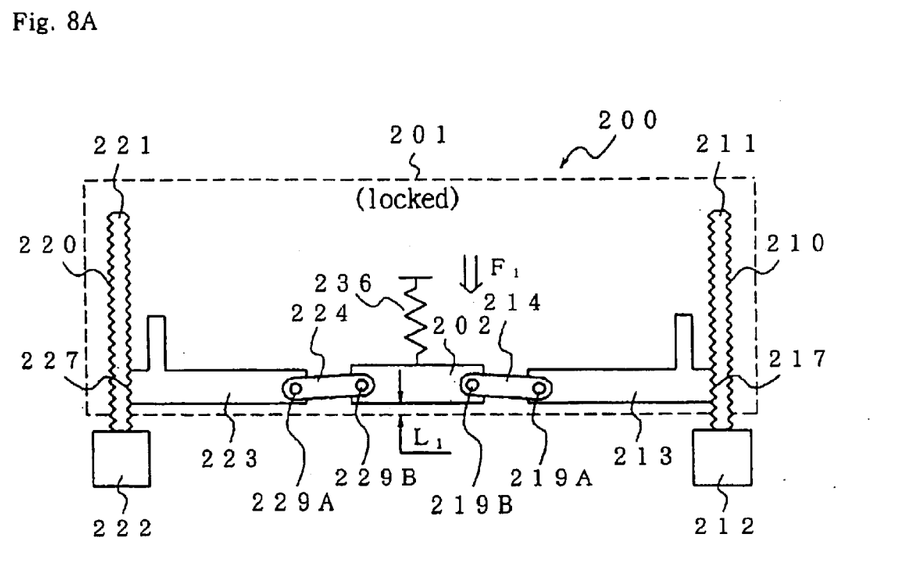
FIG. 8A shows the third embodiment of the projector of the present invention with the tilt foot in the locked state.
Figure 8B:
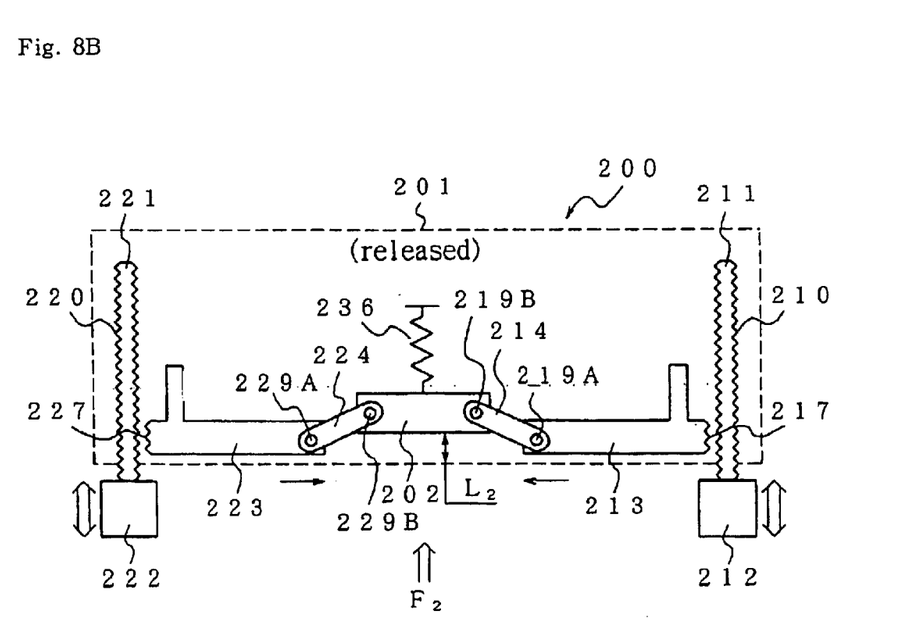
FIG. 8B shows the released state of the tilt foot shown in FIG. 8A.

FIGS. 8A and 8B show a modification of projector 200 that is shown in FIGS. 7A and 7B. FIG. 8A shows first tilt foot 210 and second tilt foot 220 in the locked state, and FIG. 8B shows first tilt foot 210 and second tilt foot 220 when the locked state is released. Of the components of projector 200 that are shown in FIGS. 8A and 8B, components that are identical to those of projector 200 shown in FIGS. 7A and 7B are given the same reference numerals, and redundant explanation is here omitted.

Projector 200 that is shown in FIGS. 8A and 8B has the advantage of reducing the number of springs for pressing the locking levers against the shafts. Specifically, only one spring is used in projector 200 that is shown in FIGS. 8A and 8B.

Projector 200 that is shown in FIGS. 8A and 8B is provided with third spring 236 in place of first spring 216 and second spring 226 that are shown in FIGS. 7A and 7B. Third spring 236 is arranged inside case 1 in a compressed state, one end being secured to any point of case 1, and the other end being secured to the rear surface of control button 202. Control button 202 is therefore ordinarily subjected to downward pressure under the restoring force $F_1$ of third spring 236, whereby first locking lever 213 is ordinarily pressed by way of first rotating lever 214 against the side of shaft 211. Similarly, second locking lever 223 is ordinarily pressed by way of second rotating lever 224 against the side of shaft 221. As a result, when control button 202 is not being manipulated, the restoring force $F_1$ of third spring 236 causes locking surface 217 of first locking lever 213 to be pressed against the outer surface of shaft 211 and locking surface 227 of second locking lever 223 to be pressed against the outer surface of shaft 221, whereby shafts 211 and 221 are locked.

However, as shown in FIG. 8B, when control button 202 is lifted upward, first rotating lever 214 and second rotating lever 224 move similarly to the first rotating lever 214 and second rotating lever 224 shown in FIG. 7B, and the locked state of shafts 211 and 221 is simultaneously released.

The shafts, feet, locking levers, rotating levers, and control button that have been described thus far are fabricated from resin or metal. Alternatively, the shafts, feet, locking levers, rotating levers, and control button can also be fabricated by a die-casting method.

While preferred embodiments of the present invention have been described using specific terms, such description is for illustrative purposes only, and it is to be understood that changes and variations may be made without departing from the spirit or scope of the following claims.

What is claimed is:

1. A tilt foot mechanism of a projector, comprising:
   two or more tilt feet that allow adjustment of a length of extension with respect to a bottom surface of said projector;
   two or more locking levers that are provided corresponding to each of said tilt feet;
   an elastic part for pressing each of said locking levers against a corresponding one of said tilt feet to lock said tilt feet; and
   a releasing means for working against a pressure exerted by said elastic part and causing said two or more locking levers to simultaneously separate from said tilt feet.

2. A tilt foot mechanism of a projector according to claim 1, wherein:
   said releasing means comprises:
   two or more rotating levers that are each linked to a corresponding locking lever; and
   a control button for causing said two or more rotating levers to simultaneously rotate;
   wherein, when said control button is pressed, said two or more rotating levers simultaneously rotate, and said locking levers that are linked to these rotating levers separate from said tilt feet against the pressure exerted by said elastic part.

3. A tilt foot mechanism of a projector according to claim 2, wherein:
   a depression is formed in each of said locking levers and said control button;
   one end of each of said rotating levers is caught by said depression in a corresponding said locking lever; and
   another end of each of said rotating levers is caught by said depression in said control button.

4. A tilt foot mechanism of a projector according to claim 2, wherein:
   one end of each of said rotating levers is rotatably linked to a corresponding said locking lever, and another end of each of said rotating levers is rotatably linked to said control button.

5. A tilt foot mechanism of a projector according to claim 2, wherein:
   one end of each of said rotating levers is linked to a corresponding said locking lever;
   another end of each of said rotating levers is linked to said control button; and
   said elastic part, by exerting pressure against said control button, exerts pressure by way of said rotating levers to force each of said locking levers against a corresponding one of said tilt feet.

6. A tilt foot mechanism of a projector according to claim 1, wherein:
   said locking lever includes a locking surface that is pressed against an outer surface of said tilt foot.

7. A tilt foot mechanism of a projector according to claim 6, wherein:
   irregularities are formed on the outer surface of each said tilt feet; and
   irregularities that mesh with the irregularities formed on the outer surface of each said tilt feet are formed on the locking surface of each of said locking levers.

8. A tilt foot mechanism of a projector according to claim 6, wherein:
   said locking surface of each of said locking levers is formed by an elastic material.

9. A tilt foot mechanism of a projector according to claim 1, wherein:
   said elastic part is a spring.

10. A projector comprising the tilt foot mechanism of a projector according to claim 1.

* * * * *